United States Patent [19]
Oushiden et al.

[11] Patent Number: 4,595,281
[45] Date of Patent: Jun. 17, 1986

[54] ORIGINAL DOCUMENT SCANNING DEVICE

[75] Inventors: Hideshi Oushiden, Kawasaki; Akihiro Nishijima, Yokohama, both of Japan

[73] Assignee: Kabushiki Kaisha Toshiba, Kawasaki, Japan

[21] Appl. No.: 688,637

[22] Filed: Jan. 3, 1985

[30] Foreign Application Priority Data

Jan. 9, 1984 [JP] Japan ................................. 59-1651

[51] Int. Cl.$^4$ ....................... G03B 27/48; G03B 27/50
[52] U.S. Cl. ................................... 355/51; 355/14 C
[58] Field of Search ................... 355/14 C, 8, 55, 51; 364/518

[56] References Cited

U.S. PATENT DOCUMENTS

4,343,036  8/1982  Shimizu et al. .................. 355/14 C
4,436,416  3/1984  Negoro et al. ..................... 355/8 X Primary Examiner—Richard A. Wintercorn
Attorney, Agent, or Firm—Cushman, Darby & Cushman

[57] ABSTRACT

An original scanning device includes a scanner for exposing an original and guiding light reflected from the original, and control means for moving the scanning means along the original at a preselected speed. The control means stores only speed data corresponding to the maximum rate of scanning and uses the data to scan at other preselected speeds.

3 Claims, 10 Drawing Figures

ORIGINAL DOCUMENT SCANNING DEVICE

BACKGROUND OF THE INVENTION

1. Field of the Invention

This invention relates to original document scanning devices, and more specifically to original scanning devices having variable scanning speed in copying machines having variable magnification.

2. Description of the Prior Art

Original document scanning devices are employed in various image forming apparatus, such as, for example, electronic copiers. Recently, electronic copiers capable of copying in reduced or enlarged sizes have been placed on the market. The operational principles of such copiers will now be described with reference to FIG. 1. An original document A set on an original table 10 is scanned for exposure by a scanning unit consisting of an exposure lamp 12 and a mirror 14. Light reflected from the original A is directed by mirrors 16 and 18, a lens 20 and a mirror 22 to a uniformly precharged rotating photosensitive drum 24. An electrostatic latent image is thus formed on the photosensitive drum 24. It is then developed, and the developer image thus formed is transferred onto a copying sheet P to complete one copying cycle.

Figure 1:
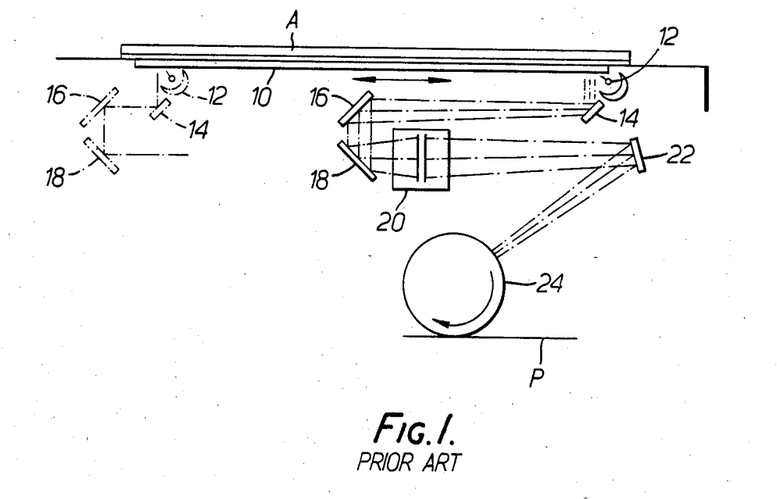
FIG. 1 is a schematic side view illustrating the operational principles of a prior art copying machine.

As for the copy size, the dimension of the copy in the scanning direction of the original is determined by the ratio between the scanning speed of the scanning unit and the rotational speed of the photosensitive drum 24 (hereinafter referred to as speed ratio). The dimension of the copy in the direction perpendicular to the scanning direction is determined by the ratio between the distance of the optical path from the original A to the lens 20 and the distance of the optical path from the lens 20 to the photosensitive drum 24 (hereinafter referred to as optical path distance ratio). Accordingly the original A can be copied on a desired scale, enlarged or contracted, by varying the speed ratio and optical path distance ratio.

Figure 2:
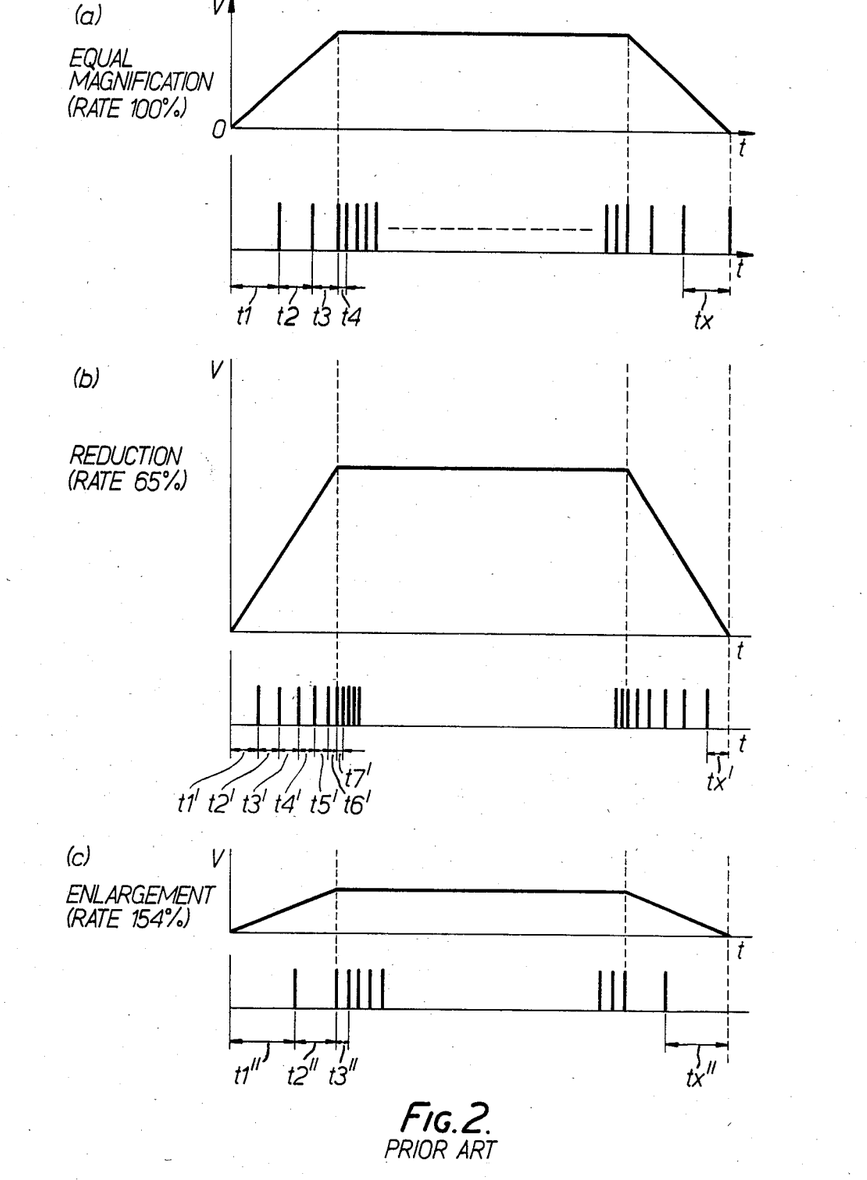
FIG. 2 is a graphic chart showing a speed curve at each magnification and phase change-over intervals of a prior art copying machine.

A problem exists, however, in that many memories are needed to vary the speed ratio. That is, the speed of the pulse motor to drive the scanning unit has to be controlled as shown in FIG. 2 (a), (b) and (c), and copying in reduction and enlargement requires establishment of a speed ratio corresponding to each magnification. Because the constant speed differs for each magnification, the acceleration from stop to a constant speed and deceleration from the constant speed to stop differs for each magnification. To store the control data in the memory for all magnifications requires memorizing a number of items, (acceleration or deceleration steps)×(numbers of magnifications), resulting in a massive memory. The resulting massive memory requires that other functions of the copying machine be sacrificed.

SUMMARY OF THE INVENTION

The present invention provides a single solution to these problems in an original document scanning device. A circuit stores control data for accelerating the scanning means toward the speed at the maximum reduction rate and decelerating from the speed corresponding to the desired magnification rate.

BRIEF DESCRIPTION OF THE DRAWINGS

These and other objects and advantages of this invention will become apparent and more readily appreciated from the following detailed description of the presently preferred exemplary embodiment taken in conjunction with the accompanying drawings, of which.

DETAILED DESCRIPTION OF THE INVENTION

Figure 3:
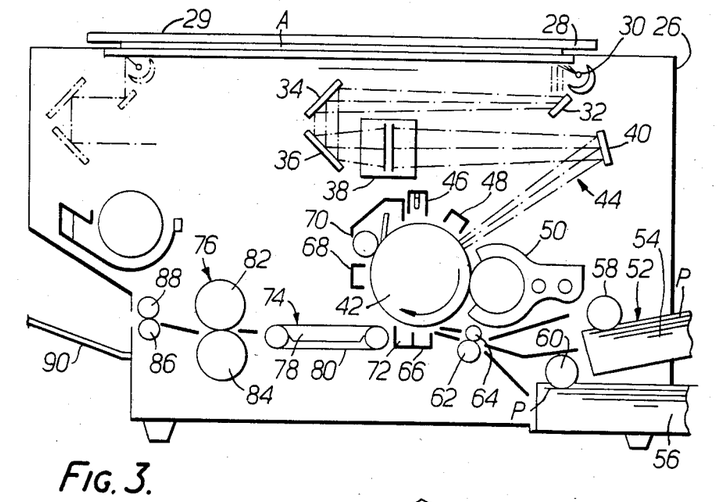
FIG. 3 is a schematic side view showing a copying machine according to one embodiment of the invention.

FIG. 3 shows a schematic side view showing a copying machine according to one embodiment of the invention. A table 28 is fixed for supporting the original document on the upper surface of the main body of the copying machine. The table 28 is made of transparent glass and an original cover 29 is provided on the table 28 so as to be freely opened and closed. The original document A set on table 28 is exposed to light during scanning. An optical system consisting of an exposure lamp 30 and mirrors 32, 34 and 36, scan the document by oscillating back and forth along the bottom surface of the table 28 in the direction of the arrow. In this case, the mirrors 34 and 36 move at half the speed of the mirror 32 so that the optical path length is kept constant. The reflected light from the original document A is reflected by said mirrors 32, 34 and 36 through a variable magnification lens block 38 to a photosensitive drum 42 after being reflected by a mirror 40, and forms an image of the original A on the surface of the photosensitive drum 42.

The surface of the photosensitive drum 42 rotating to the direction of the arrow is charged first by a charger 48 and then the image of the original document A is formed on the drum as an electrostatic latent image by slit light exposure. The electrostatic latent image becomes visible when adhered with toner from the developing unit 50. The copying paper sheets are fed out one by one by feed roller 58 or 60 from the upper stage sheet cassette 54 or the lower stage cassette 56 and led to pinch rollers 62 and 64 through a copying paper guide. The rollers 62 and 64 move the sheet to the transfer section.

The sheet cassettes 54 and 56 are mounted at the right bottom of the main body 26 and either one of them can be selected at the operating panel (not shown). The copying sheet is closely fitted to the surface of the photosensitive drum 42, and the toner image on the drum 42 is transferred by the action of a transfer charger 66. The transferred copying sheet is separated from the photosensitive drum 42 by the action of a separating charger 72, transported through the copying sheet transporter 74, and sent to a pair of fuser rollers 82 and 84 provided at the end of this section. The transferred image is fused while passing through this section. The copying paper P after fusing exits onto tray 90 provided outside of the main body 26 by a pair of exit rollers 86 and 88. The photosensitive drum 42 after transferring is discharged by a discharge charger 68 and the surface is cleaned by the cleaner 70 to remove the remaining toner. Further, the residual image is eliminated by a discharge lamp 46 to return to its initial state.

Figure 4:
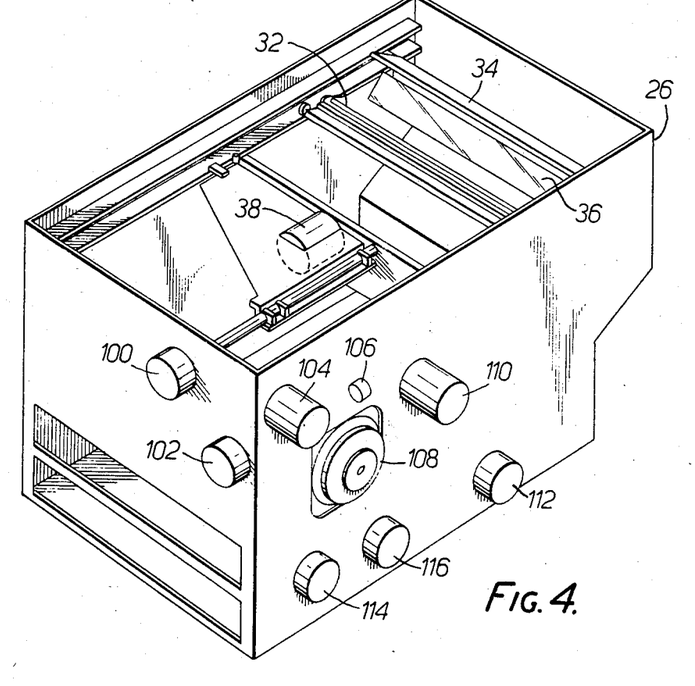
FIG. 4 is a perspective view of the copying machine of FIG. 3, showing the internal construction thereof.

FIG. 4 shows formation of a driving source at each driving section of a copying machine constructed as described above. A lens motor 100 shifts the position of the lens block 38 to vary magnification. A mirror motor 102 changes the distance between the mirror 32 and mirrors 34 and 36 (optical path length) for changing magnification. A scanning motor 104 moves the exposure lamp 30, mirror 32, and the mirrors 34 and 36 for scanning the original.

A shutter motor 106 shifts the shutter (not shown) for adjusting the width of charged area on the photosensitive drum 42 at the time of varying magnification. A developing motor 108 drives developing rollers of the developing unit 50. A drum motor 110 drives the photosensitive drum 42. A fuse motor 112 drives the copying sheet transporter 74, the fuser rollers 82 and 84 and the exit rollers 86 and 88. A sheet feed motor 114 drives the feed rollers 58 and 60. A sheet feed motor 116 drives the resist rollers 62 and 64. The motors 100 to 106, 110, 114 and 116 are four-phase pulse motors, and the motors 108 and 112 are DC brushless motors.

Figure 5:
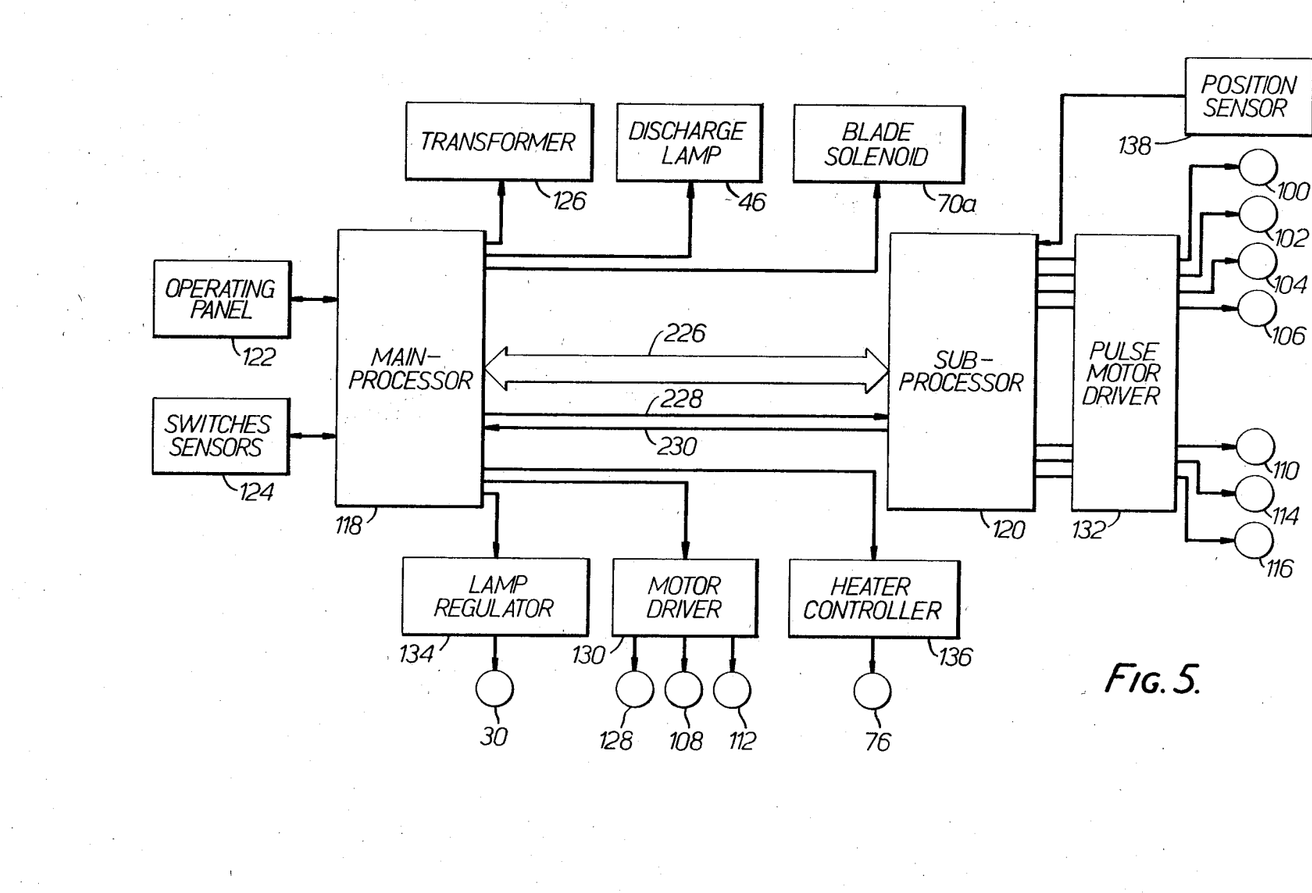
FIG. 5 is a block diagram of the overall control system.

FIG. 5 illustrates a block diagram showing the overall control system, including a main processor 118 and a subprocessor 120. The main processor 118 detects signals from the input devices such as an operating panel 122 and various switches and sensors 124, and controls a high voltage transformer 126 for driving the various chargers, the discharge lamp 46, a blade solenoid 70a of cleaner 70, a heater 76 of the fuse roller 82, the exposure lamp 30, and the various motors 100 to 116, to perform the copying operation. The motors 108 and 112, and a toner motor 128 for supplying toner to the developing unit 50 are controlled by the main processor 118 through a motor driver 130. The motors 100 to 106, 110, 114 and 116 are controlled by the subprocessor 120 through a pulse motor driver 132. The exposure lamp 30 is controlled by the main processor 118 through a lamp regulator 134 and the heater 76 is controlled by the main processor 118 through a heater control unit 136. The drive and stop commands are sent from the main processor 118 to the subprocessor 120, and the status of the drive or stop of each motor is sent from the subprocessor 120 to the main processor 118. Further, position information from a position sensor 138 detecting the initial position of each motor 100 to 106 is applied to subprocessor 120.

Figure 6:
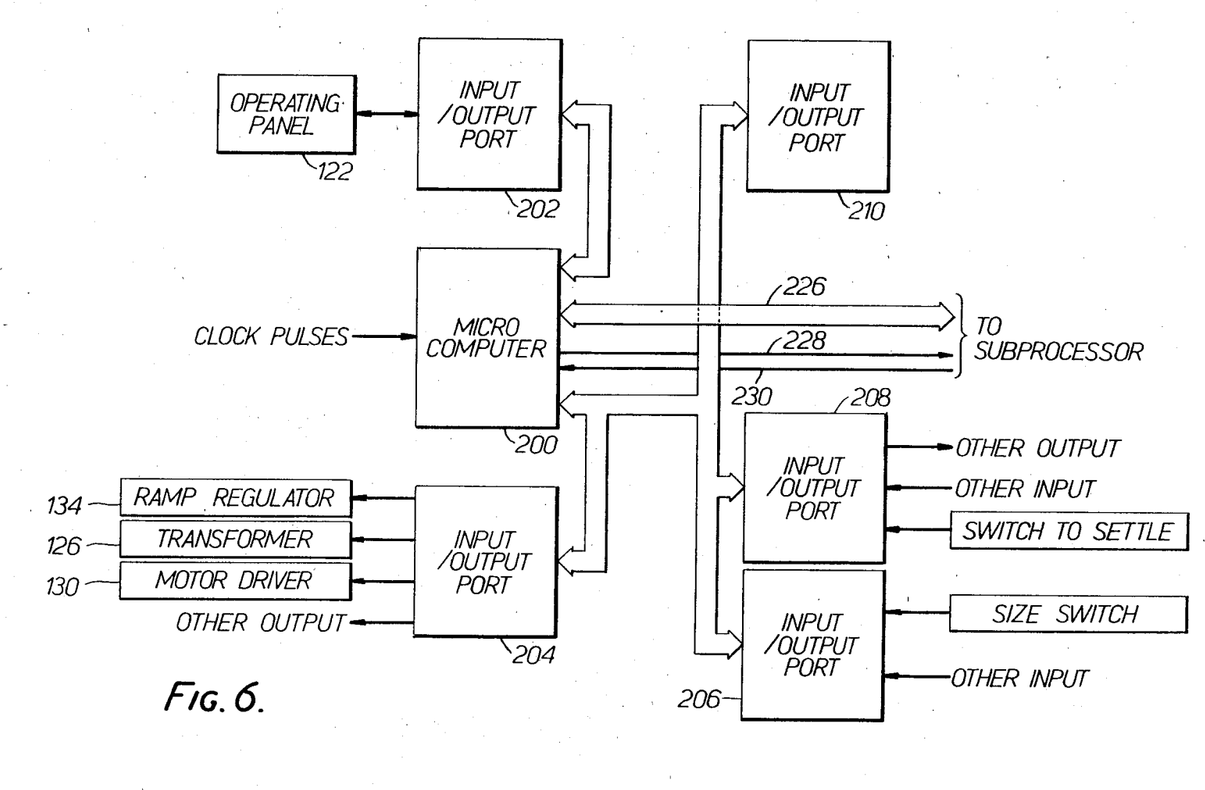
FIG. 6 is a construction diagram of a main processor.

FIG. 6 shows the construction of the main processor 118. A one-chip microcomputer 200 detects the input from the operating panel 122 and performs various indication control functions through an input/output port 202. The capacity of the microcomputer 200 is expanded by the addition of input/output ports 204 to 210. The input/output port 204 is connected with the high-voltage transformer 126, the motor driver 130, the lamp regulator 134 and other outputs. The port 206 is connected with a size switch for detecting the size of each copying sheet and other inputs, and the port 208 is connected with a switch to set the copying requirements and other input/output. The port 210 is for use to configure the devices for various options.

Figure 7:
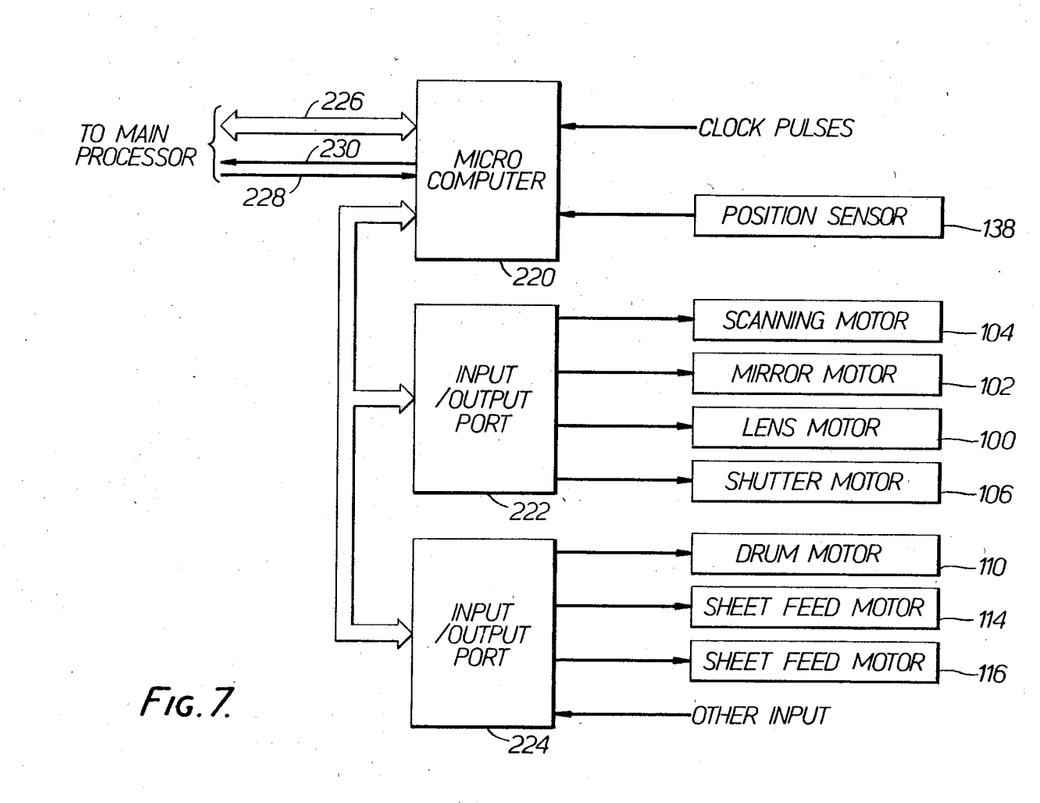
FIG. 7 is a construction diagram of a subprocessor.

FIG. 7 shows the construction of the subprocessor 120. A one-chip microcomputer 220 is connected to the main processor 118. The microcomputer 220 is supplied with position information from the position sensor 138 and is connected with input/output ports 222 and 224. The ports 222 and 224 are connected with the motors 100 to 106, 110, 114 and 116 through the motor driver 132 (not shown in the figure). The microcomputer 220 is also supplied with clock pulses.

Figure 8:
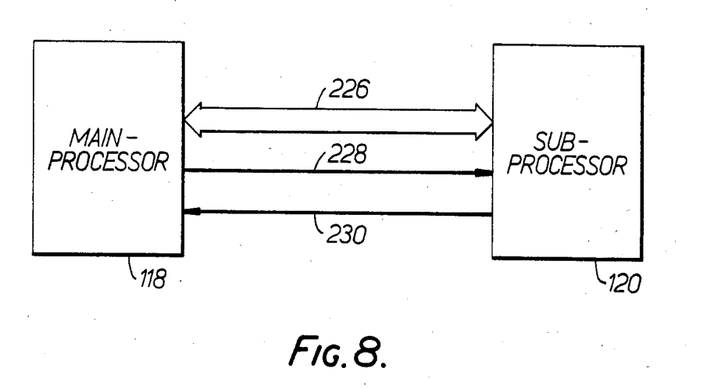
FIG. 8 is a figure showing an interface between a main processor and a subprocessor.

FIG. 8 illustrates the interface between the main processor 118 and the subprocessor 120, namely a command/status bus 226, send line 228 and acknowledge line 230. The command/status bus 226 is used as the line to send commands to the subprocessor 120 and as the signal line for sending the status of the motors controlled by the subprocessor 120 to the main processor 118. The send line 228 is the line to inform the send commands to the subprocessor 120, and the acknowledge line 230 is the line for receiving of commands from the subprocessor 120 to the main processor 118.

Figure 9:
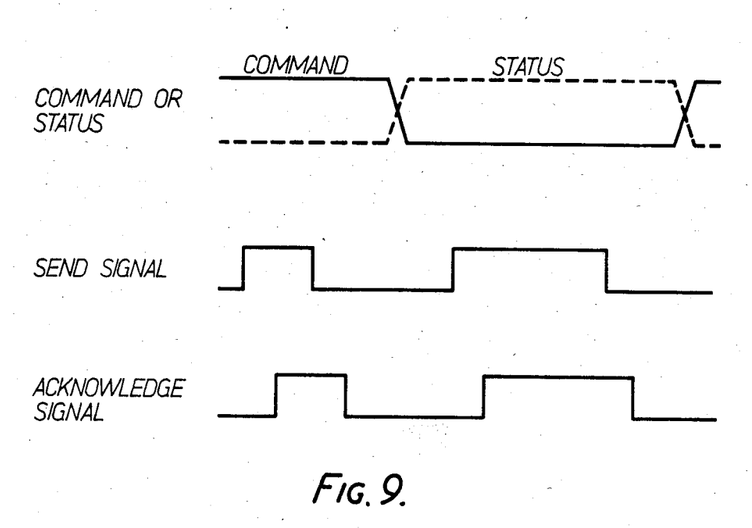
FIG. 9 is a timing chart of signals between a main processor and a subprocessor.

FIG. 9 shows the timing chart for sending the commands and the status between the main processor 118 and the subprocessor 120. The main processor 118 notices the subprocessor 120 with the sending of a command to the subprocessor 120 by a send signal on the send line 228. The subprocessor 120, after receipt of the send signal, sends an acknowledge signal to the main processor 118 to inform that the subprocessor 120 is receiving a command.

Then, the main processor 118 sends a command to the subprocessor 120 in a code having a certain meaning between the main processor 118 and the subprocessor 120. The command is composed of 8 bits. The first to fourth bits are used for identifying motors and other controlled devices, and fifth to eighth bits are used for the command to operate or stop the selected motors or other devices, and for the command to demand status signals for showing the operating condition of the selected motors or other devices. When the main processor 118 completes sending the command, it again notices the completion of the sending to the subprocessor 120 by the send signal. The subprocessor 120 replys with an acknowledge signal that the command is received securely. If the command received by the subprocessor 120 is a command to operate a motor, the subprocessor 120 makes the motor continue to operate until a stop command is sent from the main processor 118. If the received command is a status demand command, after the subprocessor 120 receives a send signal, the subprocessor 120 sends an acknowledge signal showing the beginning of sending status signal and produces a status signal. As explained above, in the main processor 118 and the subprocessor 120, the giving or receiving of a command is performed in the form of a software handshake.

Figure 10:
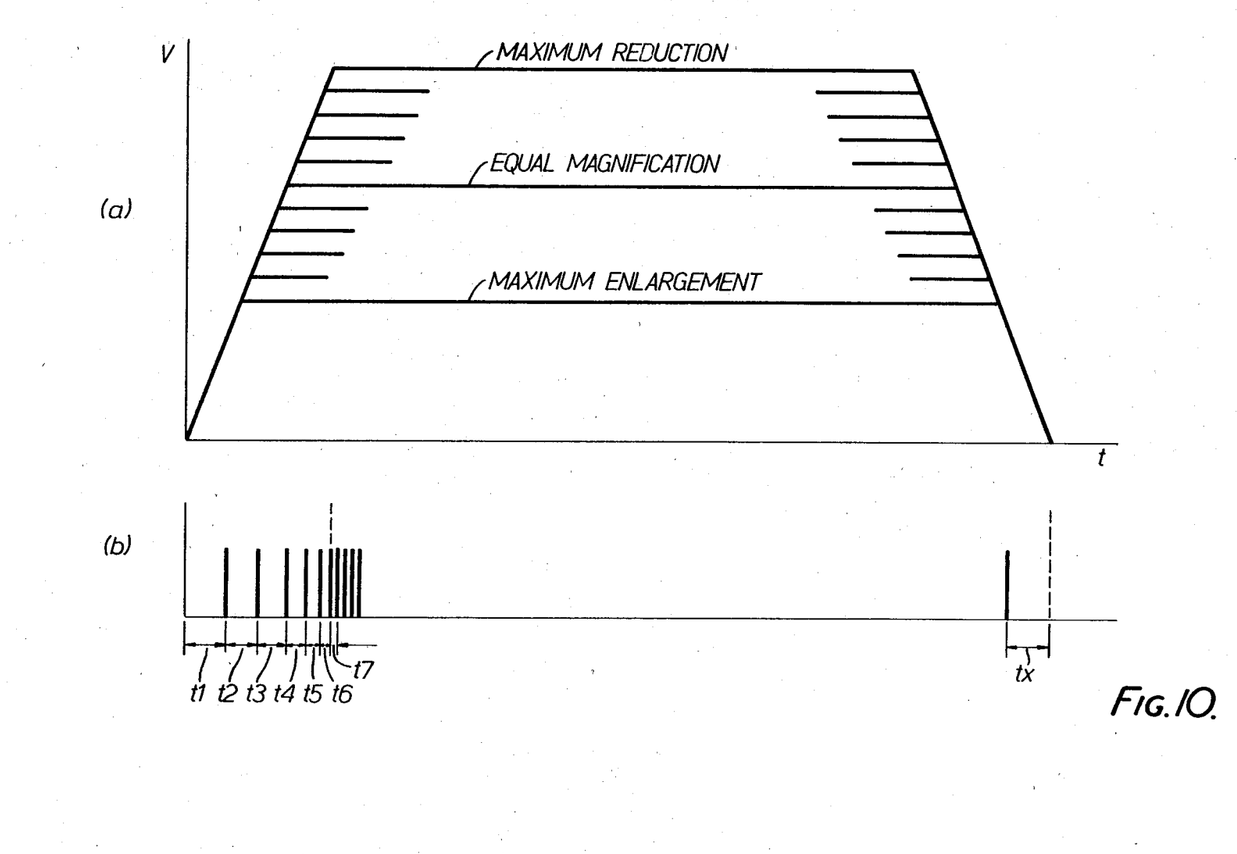
FIG. 10 is a graphic chart showing speed curves and their phase change-over intervals respectively.

Furthermore, the scanning motor 104 is speed-controlled as shown in FIG. 10. That is, the scanning motor 104 is accelerated along the speed curve of a maximum reduction rate at every magnification rate. Then, it is transferred at a constant speed at the original scanning speed of each magnification rate, and it is decelerated along the speed curve at a maximum reduction rate. For this control, only the speed curve data of the maximum reduction rate, that is, a maximum scanning speed is stored in the microcomputer 220 of the subprocessor 120. In FIG. 10(b), t1, t2, . . . , and tx are the times to show the interval of changing-over of the phase. For example, in FIG. 10, if the interval t4 after t3 is continued, the acceleration is stopped at the time after the interval t3 and the speed become constant. This constant speed is that of the equal magnification. That is, the general magnification is performed. Such controlling data as the acceleration is changed to constant speed after the interval t3 are stored in the subprocessor 120.

In the above arrangement only one speed curve is used to drive and stop the scanning motor 104 so that the capacity of the memory is extremely reduced. In this case, the numerical data of the speed curve are stored in the subprocessor 120 and the speed control is performed by the subprocessor 120, so that the main processor 118 requires only to output the drive and stop commands to the scanning motor 104 by maintaining specific timing with the subprocessor 120, which allows the main processor 118 to control other functions of the copying machine.

Thus, the subprocessor 120 controls the drive of the motors 100 to 106, 110, 114 and 116, and outputs the status signals for showing the operating condition of each motor. The main processor 118 receives the status signals transmitted from the subprocessor 120, and controls the other functions of the copying machine as well as the subprocessor 120. The arrangement, therefore, facilitates not only high speed, smooth and accurate control of all motors but also effective control of other functions without increasing memory capacity.

What is claimed is:

1. An original document scanning device comprising:
   scanning means for exposing an original document and directing light reflected from the original,
   driving means for moving said scanning means along said original document of a preselected speed,
   memory means for storing data relative to an acceleration to bring said scanning means to a maximum scanning speed, and
   control means for reading data, required to bring said scanning means to a preselected speed, from among the data stored in said memory means and for controlling said driving means according to the read data.

2. The original scanning device according to claim 1, wherein:
   said control means includes a subprocessor for controlling driving of said scanning means and producing output status signals showing operating conditions of driving, and a main processor which receives status signals from said subprocessor and controls said subprocessor.

3. The original scanning device according to claim 2, wherein:
   said subprocessor controls the scanning speed of said scanning means.

* * * * *